United States Patent
Prebeck et al.

(10) Patent No.: US 8,290,667 B2
(45) Date of Patent: Oct. 16, 2012

(54) METHOD FOR THE OPERATION OF A TRAVELING POWER TAKE-OFF SHAFT COUPLED TO A DRIVING MOTOR

(75) Inventors: Stefan Prebeck, Steyr (AT); Kurt Schachner, St. Peter/Au (AT); Günter Pilat, St. Ulrich/Steyr (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 1488 days.

(21) Appl. No.: 10/590,588

(22) PCT Filed: Feb. 16, 2005

(86) PCT No.: PCT/EP2005/001527
§ 371 (c)(1),
(2), (4) Date: May 11, 2007

(87) PCT Pub. No.: WO2005/082664
PCT Pub. Date: Sep. 9, 2005

(65) Prior Publication Data
US 2007/0207894 A1    Sep. 6, 2007

(30) Foreign Application Priority Data
Feb. 26, 2004    (DE) .......................... 10 2004 009 260

(51) Int. Cl.
*B60K 25/06*    (2006.01)
*B60K 17/28*    (2006.01)
*A01D 34/00*    (2006.01)
*A01D 69/06*    (2006.01)
*A01B 71/00*    (2006.01)
*G06F 19/00*    (2006.01)
*G06F 7/70*    (2006.01)

(52) U.S. Cl. ................ 701/50; 701/51; 701/58; 701/68; 56/10.2 R; 56/10.2 G; 56/11.1; 180/53.1; 180/53.6

(58) Field of Classification Search ................ 701/36, 701/50, 51, 53, 58, 67, 68; 56/10.2, 10.3, 56/10.8, 10.2 R, 10.2 G, 11.1; 180/53.1, 180/53.6, 53.7
See application file for complete search history.

(56) References Cited

U.S. PATENT DOCUMENTS

| | | | |
|---|---|---|---|
| 4,191,270 | A | 3/1980 | Monteith |
| 6,138,069 | A | 10/2000 | Ellertson et al. |
| 6,169,950 | B1 | 1/2001 | Parigger |
| 6,692,395 | B2 | 2/2004 | Rodeghiero et al. |
| 6,729,459 | B2 | 5/2004 | Reinards et al. |
| 6,942,595 | B2 | 9/2005 | Hrazdera |

FOREIGN PATENT DOCUMENTS

| | | |
|---|---|---|
| DE | 34 34 825 A1 | 4/1986 |
| DE | 90 12 312 U1 | 2/1991 |
| DE | 100 10 819 A1 | 9/2001 |
| DE | 101 45 643 C1 | 11/2002 |
| DE | 101 45 588 A1 | 4/2003 |
| EP | 0 511 480 A1 | 11/1992 |
| EP | 0 967 107 A1 | 12/1999 |
| EP | 1 293 113 A2 | 3/2003 |
| EP | 1 338 458 A1 | 8/2003 |

*Primary Examiner* — Thomas Tarcza
*Assistant Examiner* — Edward Pipala
(74) *Attorney, Agent, or Firm* — Davis & Bujold PLLC

(57) ABSTRACT

A method for the operation of a traveling power take-off shaft clutch connected to a drive motor, in a case of known wheel or vehicle speed, the speed of rotation of the power take-off shaft, electronically evaluated through the speed of rotation of the motor, can be made to agree in ratio with the wheel speed.

20 Claims, 2 Drawing Sheets

METHOD FOR THE OPERATION OF A TRAVELING POWER TAKE-OFF SHAFT COUPLED TO A DRIVING MOTOR

This application is a national stage completion of PCT/EP2005/001527 filed Feb. 16, 2005 which claims priority from German Application Serial No. 10 2004 009 260.5 filed Feb. 26, 2004.

FIELD OF THE INVENTION

The present invention concerns a method for the operation of a traveling, take-off power shaft connected to a drive motor by a clutch.

BACKGROUND OF THE INVENTION

Traveling power take-off shafts, appropriate to the state of the technology, have been installed in agricultural vehicles, for example in tractors, which have live axle connections, saddle supported distributors of fertilizer, drilling machines, and the like. In such cases, the traveling power take-off changes its rotation speed along with the traveling speed of the tractor, so that the speed of rotation of the take-off-shaft and the speed of the tractor remain continually in the same ratio, one to the other.

In normal practice, power take-off shafts of this kind are clutch connected at the speed of rotation of the motor directly by means of predetermined gear stage ratios. For some applications in agricultural work, it becomes necessary to have, independent of the transmission ratio, a desired rotational speed ratio between the wheel and take-off power shaft, this being particularly true in cases of driving a trucking vehicle.

According to the state of the technology, traveling power take-off shafts were connected to the output shaft by direct mechanical clutch. This practice resulted in excessive mechanical complexity. In this case—independent of the speed of rotation of the motor—a definite ratio was established between the speed of rotation of the wheels and the speed of rotation of the power take-off shaft.

EP 0 511 480 B1 discloses a changeable transmission for the drive of a power take-off shaft as applied to a farm tractor, wherein an input shaft with at least two driving gears, an output shaft with at least two free gears and an interposed, shiftable, sleeve clutch whereby the free gears are in continual mesh with the driving gears but free in respect to the input shaft. Between the driving gears is placed, in addition, a lamella clutch, which can be hydraulically activated. Moreover, at least one driving gear, located on each side of the said lamella clutch is rigidly bound to its housing.

EP 0 967 107 B1 of the applicant, teaches a method for the control of a drive unit having a stepless, adjustable transmission. Upon the installation of this drive unit into a tractor with a power take-off drive, a gas pedal is provided to serve as a power lever and also present is a manual gas lever. During a period of active manual gas operation, the position of the said manual gas lever determines a control value for the drive motor. The position of the gas pedal demands a shift of the transmission ratio, so that, by means of the gas pedal the travel speed is fixed and by means of the manual gas lever, both the travel speed and the power take-off shaft rotational speed are controlled.

The purpose of the present invention is to make a method available for the operation of a traveling power take-off shaft in clutch connection with a drive motor, which enables an interaction of the wheel and power take-off shaft by electronic means so that different ratios between the rotational speeds of the wheel and the traveling power take-off shaft can be obtained.

SUMMARY OF THE INVENTION

Figure 1:
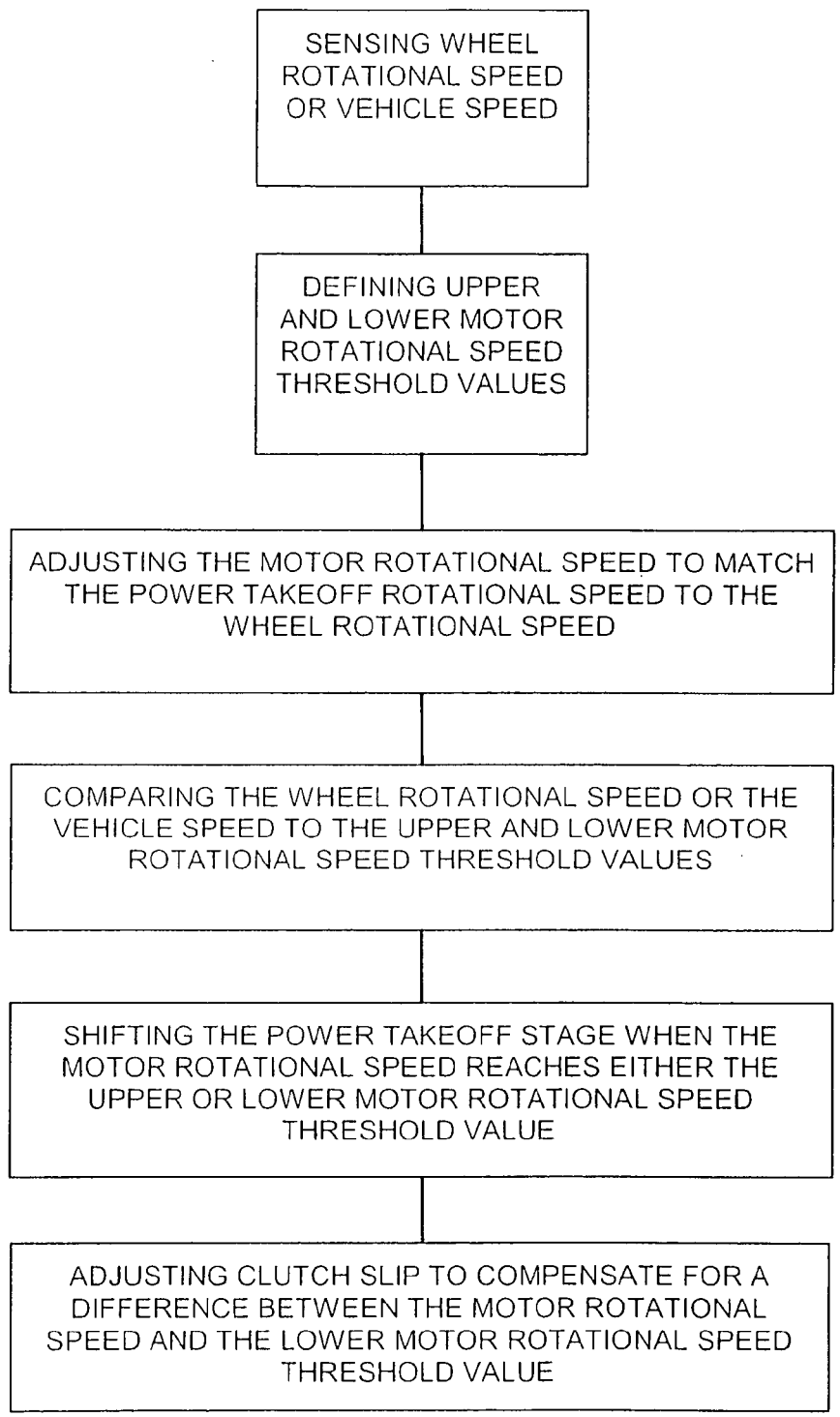
FIG. 1, illustrates a method of operating a traveling, take-off power shaft connected to a drive motor by a clutch.
Figure 2:
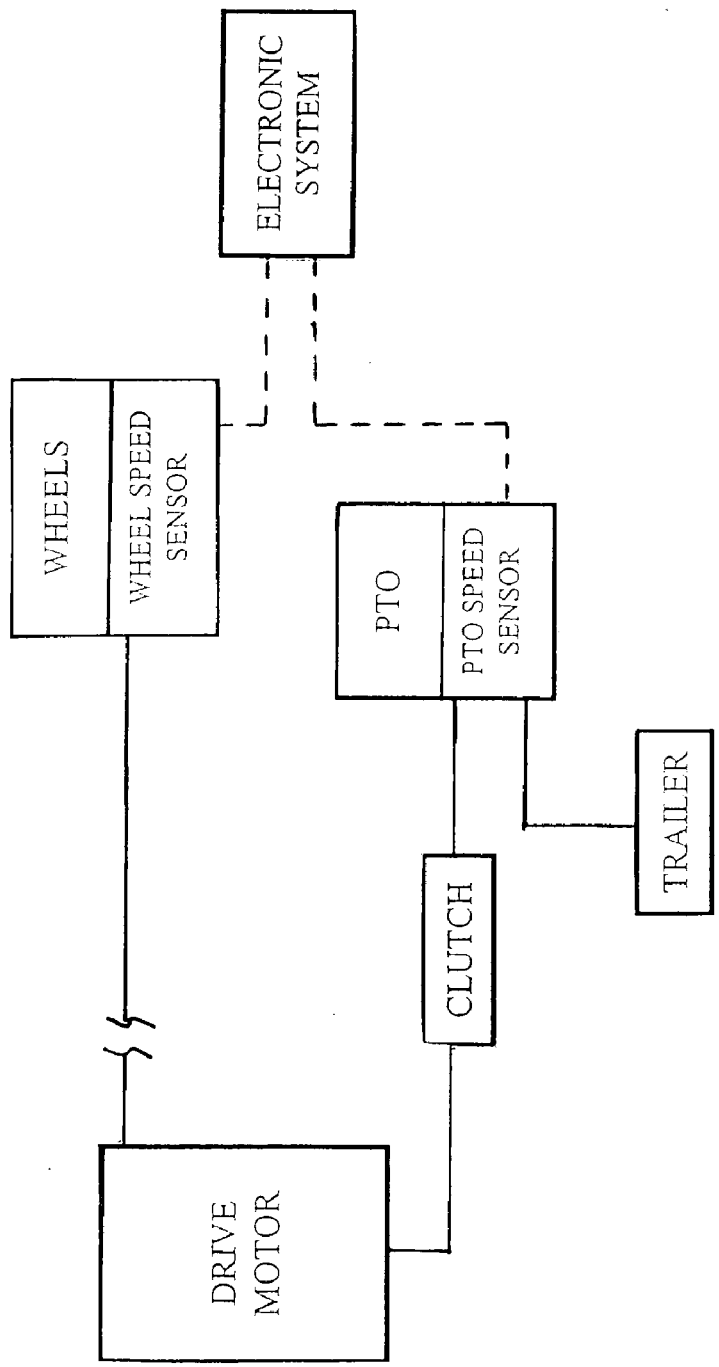
FIG. 2, is a simplified block diagram of the vehicle comprising a take-off power shaft connected to a drive motor by a clutch and an electronic system.

Accordingly, a method is shown in the FIGS. 1 and 2 and proposed in the framework of which, the rotational speed of a traveling power take-off, through the speed of rotation of the drive motor, is caused to controllingly conform to the rotational speed of the wheels by electronic intervention. This can be achieved, for example, by the use of a sensor, which measures the rotational speed of the wheel, or by other tachometrical determinations in the down-gear transmission or even other driving speed sensors, which obtain, instead of the speed of rotation, the actual speed of travel. In this case, provision is made that the electronic system, upon the attainment of an upper or lower threshold value of the motor, shifts into the next higher, i.e., the next lower gear stage of the power take-off shaft. For example, in a market of customary stages of 540, 750, or 1000 RPM, it is advantageously possible that a power take-off shaft operation can be achieved at vehicle speeds of 2.5 to 10 km/hr. The ratio of power take-off rotational speed to the rotational speed of the wheels would approximate 40/1.

In a case, wherein the traveling power take-off shaft provides power to a self-driven trailer, the system must be able to start from speed "zero". In accord with the invention, provision is made, that the difference in the speeds of rotation between the speed of rotation at speed zero (i.e., until the lower threshold speed of rotation of the motor is reached) and the lower speed of rotation threshold of the motor are to be matched in a predesigned ratio by first, a proportional valve or second, by a step motor, or third by a reinforced, power take-off slip-clutch.

Where driven trailers are a matter of concern, in accord with the invention, by means of wheel-slip know-how, it is possible, through an evaluation by the electronic system, to achieve an optimal ratio of speeds of rotation between the tractor and the trailer. This is particularly relevant in hilly country, where an assurance of safety is paramount.

In accord with the invention, the possibility exists during vehicle travel, that with special applications, the ratio of the speed of the vehicle to the speed of rotation of the traveling power take-off shaft can be adjusted by manual intervention to meet current demands.

The invention claimed is:

1. A method of operating a drive motor driving both a tractor, via a tractor drive, and a trailer, via a traveling power takeoff shaft, the traveling power takeoff shaft having at least three discrete, shiftable power takeoff gear stages and the traveling power takeoff shaft being connected to the drive motor, the method comprising the steps of:
defining higher and lower motor rotational speed threshold values and providing the higher and the lower motor rotational speed threshold values to an electronic system for controlling the drive motor and the power takeoff gear stages;

determining by a speed sensor one of a wheel speed and a vehicle speed; and operating the electronic control responsive to the one of the wheel speed and the vehicle speed, controllingly conforming a rotational speed of the traveling power takeoff shaft to a ratio of at least one of the determined vehicle speed and the determined wheel speed by adjusting slip operation of the traveling power takeoff shaft and rotation of the motor so that the tractor and the trailer travel at substantially a same speed;

comparing the determined one of the wheel speed and the vehicle speed to the higher and the lower motor rotational speed threshold values; and shifting a power takeoff stage to one of a corresponding next higher and a next lower discrete shiftable power takeoff stage, upon attainment of one of the higher and the lower motor rotational speed threshold value, so as to maintain an optimal traveling speed for both the tractor and the trailer so that both the tractor and the trailer travel together substantially as an integrated unit at substantially the same speed.

2. The method according to claim 1, further comprising the step performed by the electronic control of compensating for a difference, when starting from a zero speed, between a speed of rotation at said zero speed and the lower threshold speed of rotation of the motor, by utilizing a greater clutch-slippage of the traveling power take-off shaft.

3. The method according to claim 1, further comprising the step performed by the electronic control of achieving, in a case of self-driven trailers, with a knowledge of slip, by an evaluation by the electronic system, an optimal speed of rotation ratio between the tractor and the trailer.

4. The method according to claim 1, further comprising the step performed by the electronic control of adjusting the ratio of the vehicle speed to the traveling power take-off shaft speed of rotation to a current demand by manual intervention during travel.

5. The method according to claim 1, further comprising the step performed by the electronic control of defining the at least three discrete shiftable power takeoff stages to comprise a low stage, an intermediate stage and a high stage.

6. The method according to claim 5, further comprising the step performed by the electronic control of defining the low stage as approximately 540 RPM, the intermediate stage as approximately 750 RPM and the high stage as approximately 1000 RPM.

7. The method according to claim 1, further comprising the step of connecting the traveling power takeoff shaft to the drive motor via a clutch, and by operation of the electronic control adjusting slip of the clutch to optimize the ratio of the rotational speed of the traveling power takeoff shaft to at least one of the determined vehicle speed and the determined wheel speed.

8. A method of operating a traveling power takeoff shaft connected by a power take-off slip clutch to a drive motor for driving a trailer and the drive motor also driving the tractor, the method comprising the steps of:

providing at least three discrete, shiftable power takeoff gear stages;

sensing a wheel rotational speed with a sensor;

defining and providing to an electronic system, for controlling the drive motor and the power takeoff gear stages, a lower motor rotational speed threshold value which corresponds to a next lower power takeoff stage of the least three discrete, shiftable power takeoff stages; and adjusting rotation of the power takeoff by the power takeoff slip clutch to match rotation of the drive motor to the wheel rotational speed comparing the wheel rotational speed to the lower motor rotational speed threshold value;

shifting to the next lower power takeoff stage when the rotational speed of the drive motor achieves the lower motor rotational speed threshold value; and maintaining an optimal travel speed for both the tractor and the trailer, by shifting to a desired one of the least three discrete shiftable power takeoff stages, so that both the tractor and the trailer travel together with one another substantially as an integrated unit and at a substantially identical speed.

9. The method according to claim 8 further comprising the step performed by the electronic control of compensating for a difference in the drive motor rotation speed between a zero rotation speed and the lower motor rotation speed threshold value when, starting from the zero rotation speed, by allowing clutch slippage of the traveling power take off shaft.

10. The method according to claim 8 further comprising the step performed by the electronic control of utilizing clutch slip and the electronic system to optimize a speed of rotation ratio between the tractor and the trailer, in a case of self-driven trailers.

11. The method according to claim 8, further comprising the step performed by the electronic control of adjusting a ratio of the vehicle speed to the rotation of the traveling power take-off shaft to current demand by manual intervention during travel.

12. The method according to claim 8, further comprising the step performed by the electronic control of defining the at least three discrete shiftable power takeoff stages to comprise a low stage, an intermediate stage and a high stage.

13. The method according to claim 12, further comprising the step performed by the electronic control of defining the low stage as approximately 540 RPM, the intermediate stage as approximately 750 RPM and the high stage as approximately 1000 RPM.

14. A method of operating a traveling power takeoff shaft that is connected to a drive motor and the traveling power takeoff shaft having at least three discrete, shiftable power takeoff shaft gear stages and the drive motor also driving rear wheels of a tractor, the method comprising the steps of:

monitoring a vehicle travel speed with a sensor; and by operation of the electronic control and responsive to the vehicle travel speed, adapting a rotational speed of the power takeoff shaft to conform to one of the vehicle travel speed and the rear wheel rotational speed, so that a towed trailer travels at substantially a same speed as a speed of the vehicle, by each of:

electronically shifting the traveling power takeoff shaft to a next higher takeoff shaft gear stage of the least three discrete, shiftable power takeoff stages, if a rotational speed of the drive motor essentially equals an upper rotational speed threshold;

electronically shifting the traveling power takeoff shaft to a next lower takeoff shaft gear stage of the least three discrete, shiftable power takeoff stages, if the rotational speed of the drive motor essentially equals a lower rotational speed threshold; and adapting slip engagement of the clutch of the power takeoff shaft to match a difference between the rotational speed of the power takeoff shaft at a vehicle travel speed of zero and the lower rotational speed threshold of the drive motor to a predefined ratio.

15. The method according to claim 14, wherein the at least three discrete shiftable power takeoff stages comprise a low stage, an intermediate stage and a high stage.

16. The method according to claim 15, further comprising the step of defining the low stage as approximately 540 RPM, the intermediate stage as approximately 750 RPM and the high stage as approximately 1000 RPM.

17. The method according to claim 16, further comprising the step of defining a ratio of power take-off rotational speed to wheels rotational speed as approximately 40 to 1.

18. The method according to claim 16, further comprising the step performed by the electronic control of operating the power take off shaft at vehicle speeds of between 2.5 to 10 km/h.

19. The method according to claim 16, further comprising the step performed by the electronic control of obtaining different ratios between rotational speeds of the wheels and the traveling power take-off shaft.

20. A method of operating a power takeoff shaft of a tractor that is connected, via a slip clutch, to a drive motor and the power takeoff shaft having at least three discrete, shiftable power takeoff shaft gear stages, including a low stage, an intermediate stage and a high stage, the method comprising the steps of:

monitoring a travel speed and a motor speed of the tractor with sensors;

initiating travel of the tractor by adjusting the motor speed and adjusting rotation of the power takeoff shaft, via the slip clutch such that the rotational speed of the power take off shaft matches the travel speed of the tractor;

electronically shifting the power takeoff shaft to the intermediate stage, when the motor speed equals a next higher rotational speed threshold;

further adjusting the motor speed and further adjusting the rotation of the power takeoff shaft, via the slip clutch such that the rotational speed of the power take off shaft matches the travel speed of the tractor; and electronically shifting the power takeoff shaft to either the low stage or the high stage of the power takeoff, when the motor speed equals a respective one of a lower rotational speed threshold or a subsequent next higher rotational speed.

* * * * *